United States Patent [19]
Maron

[11] Patent Number: 5,844,667
[45] Date of Patent: Dec. 1, 1998

[54] FIBER OPTIC PRESSURE SENSOR WITH PASSIVE TEMPERATURE COMPENSATION

[75] Inventor: Robert J. Maron, Cromwell, Conn.

[73] Assignee: CiDra Corporation, Wallingford, Conn.

[21] Appl. No.: 790,072

[22] Filed: Jan. 28, 1997

[51] Int. Cl.⁶ ..................................................... G01B 9/02

[52] U.S. Cl. .......................... 356/35.5; 356/345; 356/32; 250/227.18

[58] Field of Search ............................ 356/35.5, 32, 345, 356/352; 250/227.18, 227.19, 227.23, 227.27; 385/37

Primary Examiner—Samuel A. Turner

[57] ABSTRACT

A temperature compensated intrinsic optical fiber pressure sensing device includes an intrinsic fiber optic sensor formed in a core of an optical fiber. A diaphragm responsive to a pressure in an environment applies a longitudinal strain in the optical fiber, thereby inducing a pressure stress in the intrinsic fiber optic sensor. The intrinsic fiber optic sensor is responsive to an optical signal and to the pressure stress for providing a sensing light signal indicative of the pressure. A temperature compensation members are responsive to a temperature for applying a longitudinal strain in the optical fiber, thereby inducing a temperature compensation stress in the intrinsic fiber optic sensor indicative of the temperature, wherein changes in the sensing light signal that are attributable to changes in the temperature compensation strain substantially compensates for changes in the sensing light signal attributable to changes in the temperature of the intrinsic fiber optic sensor.

6 Claims, 3 Drawing Sheets

FIBER OPTIC PRESSURE SENSOR WITH PASSIVE TEMPERATURE COMPENSATION

TECHNICAL FIELD

The present invention relates to fiber optic sensors, and more particularly, to a temperature compensated intrinsic fiber optic pressure sensing device.

BACKGROUND OF THE INVENTION

In the measurement of the pressure of a fluid, for example high pressure and temperature liquid and/or gas in an oil or gas well, the fluid may undergo changes in temperature during the measurement process which may cause errors in the pressure measurement. Various sensing devices which convert pressure to a signal suitable for transmission, usually either electrical or optical, must be in thermal contact with the fluid, and thus are subject to the such temperature changes. Due to the effect of temperature changes on the various physical properties (e.g., thermal expansion, electrical resistivity, modulus of elasticity, speed of sound) of the many different materials used in pressure sensing devices, a temperature induced error will often be produced when such a device undergoes a temperature excursion. This error may be significant, particularly for large temperature excursions and/or high accuracy pressure measurements. Therefore, it is often essential to compensate or correct for this temperature induced error in some way.

It is generally known in the art to provide temperature compensation for pressure sensing devices, in general, by two methods. In the first method, a temperature reading can be obtained by using a separate temperature sensor that is in good thermal contact with the same environment as the pressure sensing device. The reading from the temperature sensor can be used to correct for a temperature induced pressure error which has been previously characterized. In an electronic circuit, such compensation can be achieved entirely within the electronic circuit's hardware, or by using a software program of some form, or by a combination of both. While this method provides temperature compensated pressure signals, this method requires complex processing and instrumentation.

In the second method, the pressure sensing device, which converts the measurand signal to a suitable electrical or optical signal, is constructed in such a way as to provide inherent temperature compensation. However, electrical pressure sensors degrade over time, particularly when subjected to high temperatures. Additionally, temperature compensated optical pressure sensors are typically not suited for the caustic, high temperature and pressure environment of an oil or gas well.

Fiber optic Bragg grating sensors are particularly useful for measuring temperature and strain, induced for example by pressure or pressure variations, because of their intrinsic and wavelength-encoded operation. In particular, the frequency of light (center wavelength) reflected by such Bragg grating sensors varies either with the strain to which the grating region is subjected, or with the temperature of the grating region, in a clearly defined relationship, which is substantially linear at least within the range of interest, to either one of these parameters. As discussed in U.S. Pat. No. 4,725,110, issued Feb. 16, 1988, it is possible to employ this kind of a sensor in an environment where both the strain of the grating region due to external forces imposed on the fiber, and the temperature of the grating region, vary with time in a manner that is not necessarily concurrent. The reflected wavelength changes attributable to the grating region strain, on the one hand, and the grating region temperature, on the other hand, are separately evaluated. A pressure measurement must be temperature compensated, for example using one of the methods discussed above.

U.S. Pat. No. 5,042,898. issued Aug. 27, 1991, discloses a temperature compensated Bragg grating sensor wherein the temperature dependency of the sensor is compensated such that the sensor operates independent of temperature. However, this sensor is also isolated from other strain which could vary the reflected wavelength such that the sensor may be operated, for example, as a frequency standard.

There therefore exists a need for a pressure sensing device suitable for use in the caustic, high temperature and pressure environment of an oil or gas well, wherein the device provides a temperature corrected pressure signal which requires no additional processing, thus simplifying instrumentation requirements. There further exists the need for such a device which is higher in reliability, lower in cost, smaller in overall size, and having increased ease of use than known pressure sensing devices.

SUMMARY OF THE INVENTION

Objects of the present invention include the provision of a pressure sensing device suitable for use in the caustic, high temperature and pressure environment of an oil or gas well.

A further object of the invention is to provide temperature corrected pressure signals from such a device which require no additional processing.

A still further object of the invention is to provide such a pressure sensing device which is higher in reliability, lower in cost, smaller in overall size, and having increased ease of use than known pressure sensing devices.

Another object of the invention is to provide such a pressure sensing device having passive temperature compensation inherent in the device which is capable of operating with high accuracy over a wide temperature range.

According to the invention, a temperature compensated intrinsic optical fiber pressure sensing device includes an intrinsic fiber optic sensor formed in a core of an optical fiber; displacement means responsive to a pressure for applying a longitudinal strain in the optical fiber, thereby inducing a pressure stress in the intrinsic fiber optic sensor, the intrinsic fiber optic sensor being responsive to an optical signal and to the pressure stress for providing a sensing light signal indicative of the pressure; and temperature compensation means responsive to a temperature for applying a longitudinal strain in the optical fiber, thereby inducing a temperature compensation stress in the intrinsic fiber optic sensor indicative of the temperature, wherein changes in the sensing light signal that are attributable to changes in the temperature compensation strain substantially compensates for changes in the sensing light signal attributable to changes in the temperature of the intrinsic fiber optic sensor.

Such a sensor is simple to construct, can be made very small, and simplifies instrumentation due to the fact that the sensing light signals provided to the instrumentation require no further temperature compensation. Additionally, such a sensor is capable of operating at temperatures above those at which conventional electronic sensors can operate, due to the higher temperature capabilities of optical fibers, particularly those with special high temperature coatings. The sensor of the invention may be mounted at the end of a capillary tube carrying the optical fiber such that the optical fiber is completely isolated from the environment in which the sensor is deployed. Therefore, the sensor of the invention is particularly well suited for use in an extremely harsh environments, such as in an oil or gas well.

The foregoing and other objects, features and advantages of the present invention will become more apparent in light of the following detailed description of exemplary embodiments thereof.

BRIEF DESCRIPTIONS OF THE DRAWINGS

FIG. 1 is a schematic block diagram of the temperature compensated pressure sensing device of the invention utilized in an earth borehole of an oil or gas well;

FIG. 2 is a cross-sectional side elevational view of the temperature compensated pressure sensing device of FIG. 1 including an optical fiber having an intrinsic fiber optic sensor and two compensating members that cooperate with one another and with the fiber in such a manner that tensile stresses applied thereby to the fiber cause the wavelength at which the sensor is reflective to be substantially independent of temperature; and FIG. 3 is a perspective view of the temperature compensated pressure sensing device of FIG. 2.

DETAILED DESCRIPTION OF THE INVENTION

The present invention is particularly well suited for providing temperature corrected pressure signals which require no additional processing. The device of the invention is suitable for use in a caustic, high temperature and pressure environment, such as the environment found downhole in an oil or gas well.

Figure 1:
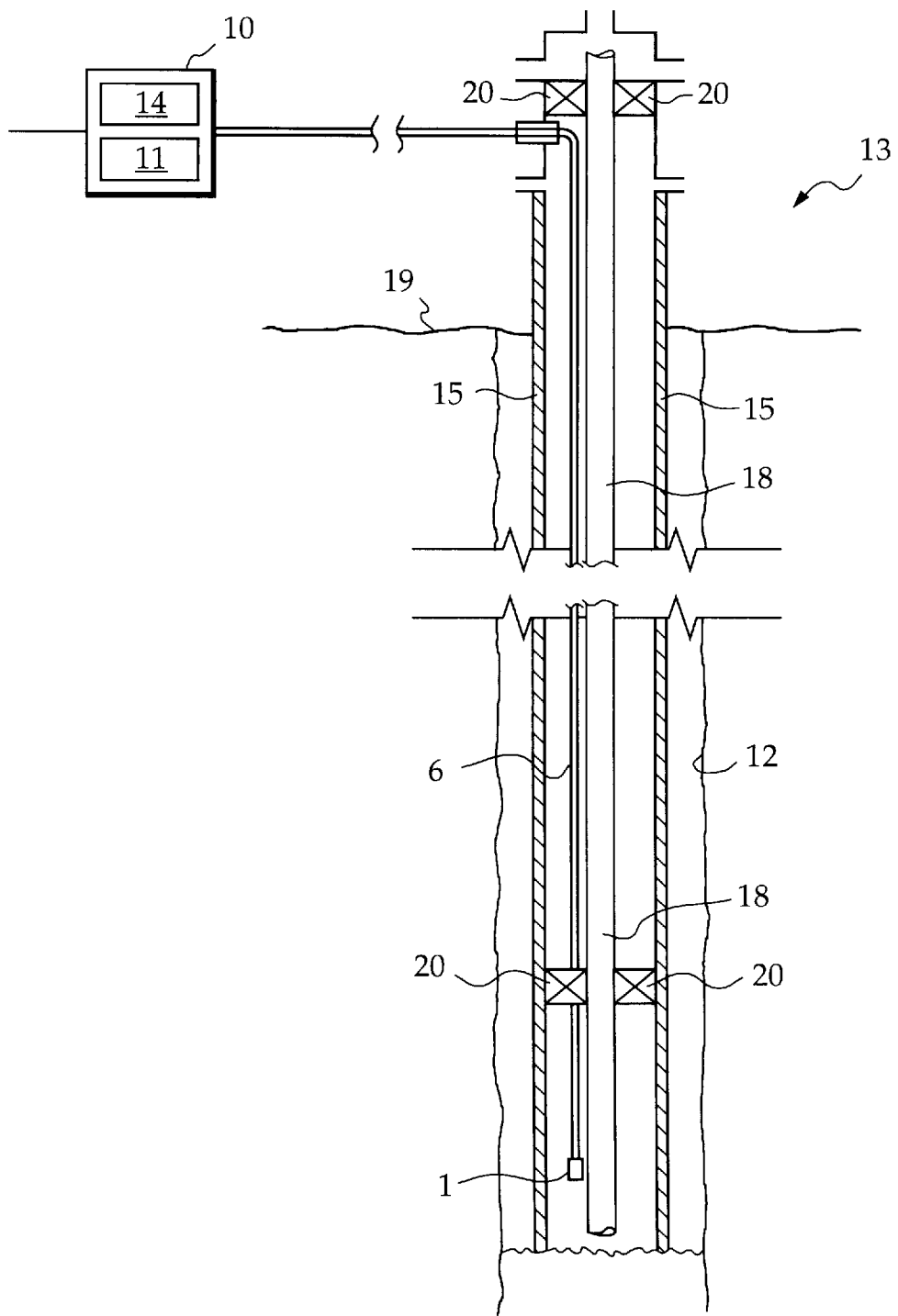
Figure 2:
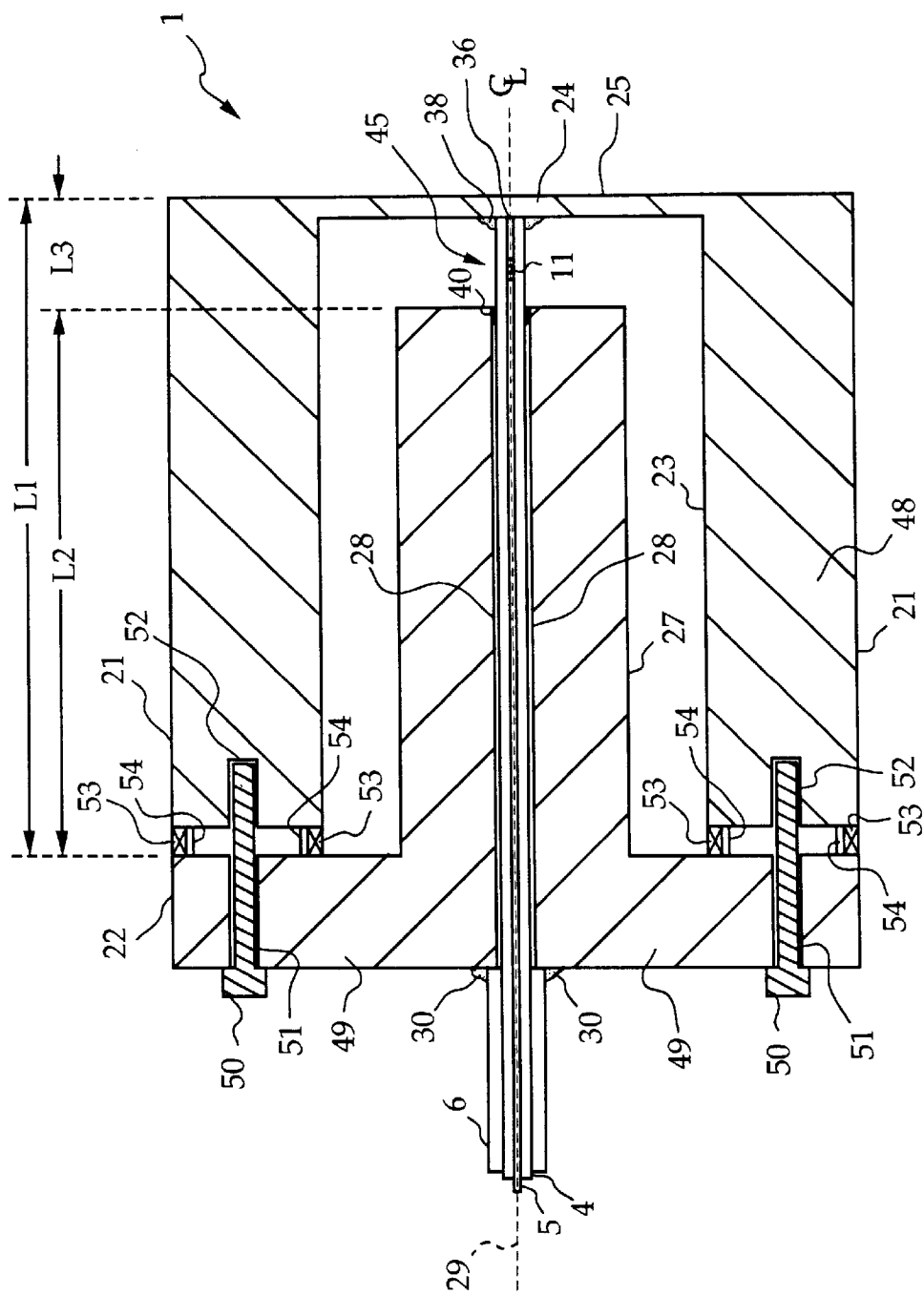

Referring now to FIGS. 1 and 2, the pressure sensing device 1 includes an optical fiber 4 having a light guiding core 5, and an intracore reflective element, such as a fiber Bragg grating 11, formed therein and utilized as a pressure sensor. The optical fiber 4 may be positioned within a capillary tube 6 to protect the optical fiber 4 from the harsh environment.

As is known to those skilled in the art, fiber gratings (Bragg gratings) are well suited for use as sensing elements. When a fiber grating is illuminated, the grating reflects a narrow band of light having a specified central wavelength. However, a measurand, such as strain induced by pressure, will induce a perturbation of the grating sensor spacing due to overall fiber elongation, and of the refractive index of the glass due to photoelastic effects, which together change the wavelength of the light reflected by the grating. The value of the measurand is directly related to the wavelength reflected by the grating and can be determined by detecting the wavelength of the reflected light.

As is further known in the art, the wavelength encoded nature of the output of fiber gratings has advantages over intensity based sensing techniques because of the self-referencing nature of the output. This sensed information is encoded directly into the wavelength, which is an absolute parameter and does not depend upon total light levels, losses in fibers or couplers, or variations in source intensity. In contrast, intensity-based sensing schemes depend upon total light levels and are affected by losses in the connected fibers, by losses in couplers, and by variations in source intensity.

Referring back to FIG. 1, the pressure sensing device 1 is positioned at a distal end of the capillary tubing 6 and is interconnected to optical signal processing equipment 10 via the optical fiber 4 and well-known capillary tube delivery equipment (not shown). The not shown delivery equipment is utilized for delivering the pressure sensing device 1 and the capillary tubing 6 down a wellbore 12 of an oil and/or gas well 13, and for the delivery of optical signals between the optical signal processing equipment 10 and the pressure sensing device 1, either directly or via interface equipment (not shown) as required.

The optical signal processing equipment 10 includes, at a minimum, a broadband source of light 11, such as a light emitting diode (LED), and appropriate light filtering equipment for delivery of signal light to the Bragg grating 11 included within the pressure sensing device 1, as described in greater detail below. Additionally, the optical signal processing equipment 10 includes appropriate optical signal analysis equipment 14 for analyzing the return signals from the Bragg grating 11. For example, the signal analysis equipment 14 may include the necessary hardware and software to implement the optical signal diagnostic equipment disclosed in U.S. Pat. Nos. 4,996,419; 5,401,956; 5,426,297; and/or 5,493,390, the disclosures of which are incorporated herein by reference to the extent necessary to explain how return signals from Bragg grating are processed.

As is well known in the art, there are various optical signal analysis approaches which may be utilized to analyze return signals from optical fiber Bragg gratings. These approaches may be generally classified in the following four categories:

1. Direct spectroscopy utilizing conventional dispersive elements such as line gratings, prisms, etc., and a linear array of photo detector elements or a CCD array;
2. Passive optical filtering using both optics or a fiber device with wavelength-dependent transfer function, such as a WDM coupler;
3. Tracking using a tuneable filter such as, for example, a scanning Fabry-Perot filter, an acousto-optic filter such as the filter described in the above referenced U.S. Pat. No. 5,493,390, or fiber Bragg grating based filters; and
4. Interferometric detection. The particular technique utilized will vary, and will depend on the Bragg wavelength shift magnitude (which depends on the sensor sensitivity and measurand strength) and the frequency range of the measurand to be detected.

In the example of the present invention, the pressure sensing device 1 is utilized to measure pressure within the wellbore 12 of the oil and/or gas well 13. Within the wellbore 12 are casing strings 15, production tubing 18, and a production packers 20. The pressure sensing device 1 is interconnected via appropriate optical fibers, couplers, etc., to the optical signal processing equipment 10, which is located above the surface 20 of the wellbore 12.

Figure 3:
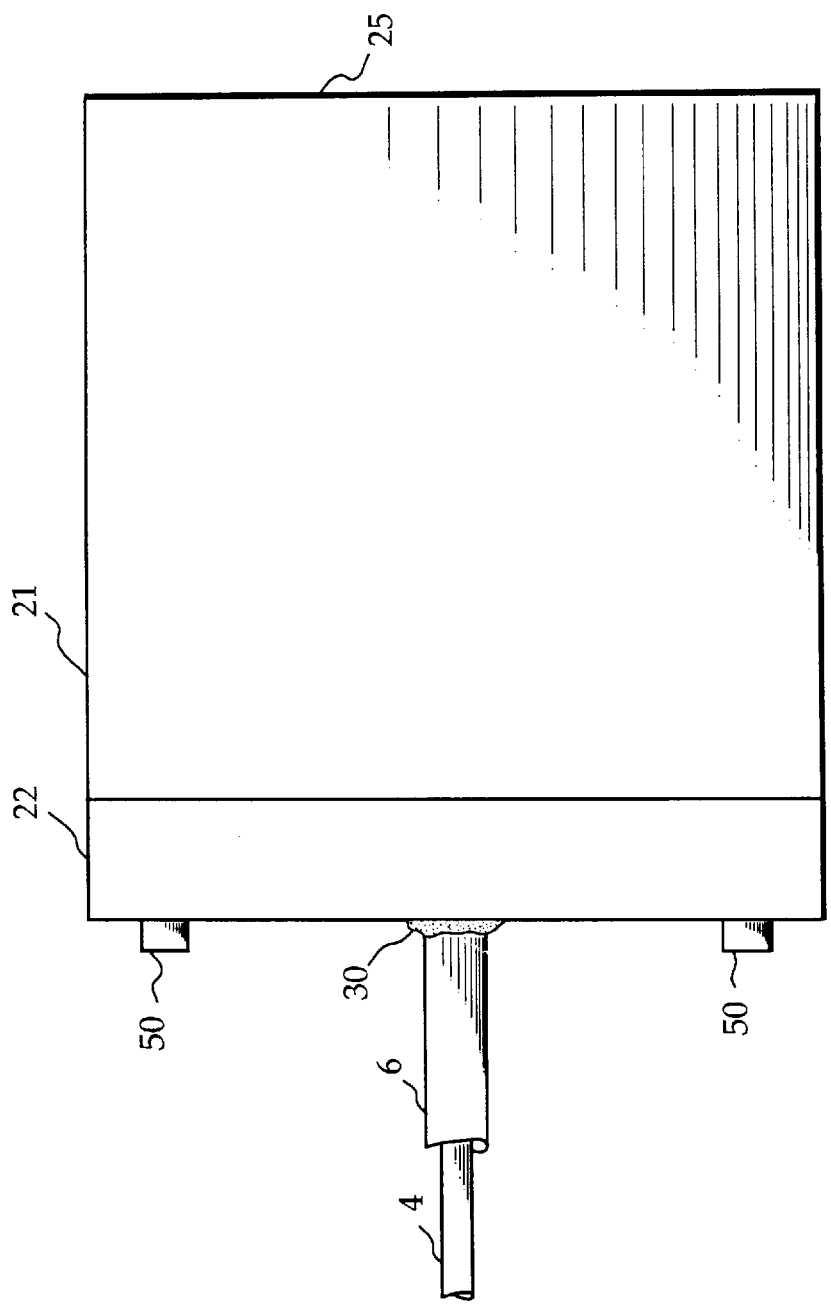

Referring to FIGS. 2 and 3, the pressure sensing device 1 is cylindrical in shape and includes a first compensating member 21 and a second compensating member 22. The first compensating member 21 has a central recess 23 and a bridge portion 24, which in accordance with the invention is a flexible diaphragm which flexes in response to forces, such as fluid pressure, exerted on an outward face 25 thereof. The second compensating member 22 includes a central projection 27 extending into the recess 23 and terminating short of the diaphragm 24. The projection 27 has an axial channel 28 extending along a central axis 29 thereof. The optical fiber 4 is received through the axial channel 28. The capillary tube 6 is attached to the second compensating member 22 at an attachment location 30 by a suitable method, such as a weld or high strength adhesive, to provide a seal between the capillary tube 6 and the second compensating member 22 to prevent exposure of the optical fiber 4 to the environment.

A distal end 36 of fiber 4 is terminated in an anti-reflective manner, so as to prevent interference with the reflected wavelengths from the Bragg grating 11. For example, the distal end 36 of the fiber 4 may be cleaved at an angle so that the end face is not perpendicular to the fiber axis. Alternatively, the distal end 36 of the fiber 4 may be coated with a material that matches the index of refraction of the fiber, thus permitting light to exit the fiber without back reflection, and be subsequently disbursed in the index-matching material.

The optical fiber 4 is connected at its distal end 36 to the diaphragm 24 at an attachment location 38. The optical fiber is also attached at a second location 40, spaced from the distal end 36, to the projection 27 of the second compensating member 22. The attachments may be may by respective connecting members 38 and 40. The connecting members 38 and 40 may be of a mechanical type, such as clamps or the like, or they may be constituted by respective bodies, layers or pads of adhesive, solder, weld, or the like. In any event, the connecting members 38 and 40 define the length L3 of a fiber section 45 that spans the distance between the attachment points of the optical fiber 4 to the compensating members 21 and 22 and rigidly connect the fiber section 45 with the compensating members 21 and 22.

Application of a pressure to the outside face 25 of diaphragm 24 causes diaphragm 24 to displace from its equilibrium position. The central portion of diaphragm 24 to which fiber 4 is attached at location 38 experiences the greatest displacement. This displacement results in a change in length L3, and a resultant change in the strain on the fiber section 45 over length L3, and thus a change in the strain on the Bragg grating 11.

As disclosed above, the Bragg grating 11 consists of a periodic variation of the index of refraction of the fiber core material 5 (i.e. a variation in the speed of light within the fiber core), which forms a resonant cavity for particular central wavelengths of light corresponding to particular periodic grating spacing. Such resonant cavity will then reflect only light of this particular central wavelength $\lambda$, while permitting light of all other wavelengths to pass without significant attenuation. It is well known that if strain is applied to the reflective grating 11, a change in the central wavelength of the resonant cavity 11 will occur due to a change in the periodic spacing of the grating, and which will appear as a wavelength shift in the reflected light. If the strain is produced by a change in the pressure of a fluid or gas by means of a suitable pressure sensing device, such as the device 1 of the invention, then the wavelength shift of the central reflected wavelength can be related to the pressure change.

The compensating members 21 and 22 further have respective cooperating portions 48 and 49 which are rigidly connected to or integral with the diaphragm 24 and with the projection 27, respectively, and are juxtaposed with one another in the assembled condition of the device 1. The compensating members 21 and 22 are connected with one another by respective preloading members 50, such as, as illustrated, screws with fine pitch threads which pass through respective unthreaded bores 51 in the portions 49 and are threaded into corresponding threaded bores 52 of the portions 48. Positioned between the portions 48 and 49 are sealing means 53, such as high strength, corrosion and temperature resistant o-rings, for providing a seal therebetween to prevent exposure of the fiber 4 to the environment. In addition, the first portions 48 of the first compensating member 21 may be provided, at the regions that are juxtaposed with the corresponding portions 49 of the second compensating member 22, with integral spring contacts 54 that are in contact with the portions 49 in the operating condition of the device 1. As the preloading members 50 are tightened, the spring contacts 54 are caused to resiliently yield with the result that the forces exerted on the compensating member 22 by the preloading members 50 and by the optical fiber portion 45, on the one hand, and by the spring contacts 54, on the other hand, establish an equilibrium, and thus hold the compensating member 22 in any selected position in an operating range with respect to the compensating member 21. It may be seen that, inasmuch as the fiber attachment points constituted by the connecting members 38 and 40 are spaced from a contact plane between the compensating members 21 and 22 by respective distances L1 and L2 and the distance L3 is the difference between the distances L1 and L2, it is possible to change the distance L3 by simply tightening or loosening the preloading members 50. This means that the section 45 of the optical fiber 4 can be subjected to tensile preloading stresses simply by first tightening the preloading members 50 to the extent needed for the compensating member 22 to reach its position at the end of the desired operating range relative to the compensating member 21, followed by connecting the optical fiber 4 in a substantially taut condition between the aforementioned attachment points to the compensating members 21 and 22 by means of the connecting members 38 and 40, and then by loosening or tightening the preloading members 50 to the extent needed for the grating 11 to be reflective to light in the narrow range around the desired wavelength $\lambda$.

During the subsequent use of the device 1 following the preloading of the fiber portion 45 containing the Bragg filter grating 11, the effect of differential thermal expansions between the materials of the compensating members 21 and 22 is being used to partially relieve the tension applied to the fiber portion 45 with a temperature increase (and vice versa on a temperature decrease), to thus balance out or compensate the change in the frequency of the Bragg grating 11 with the changing temperature. The rate of relieving tension can be chosen in such a manner, by choosing materials with appropriate thermal expansion coefficients for the compensating members 21 and 22 and by adjusting the geometry, as to hold the frequency of the Bragg grating 11 constant. In the device 1 illustrated in FIG. 2 of the drawing, the material of the compensating member 22 has a larger temperature coefficient of expansion than the material of the compensating member 21. As a consequence, the tensile stress of the fiber portion 45 containing the Bragg grating region 11 will be relieved on a temperature increase and increased on a temperature drop. In this case the attached fiber portion 45 is preloaded in tension with a mechanical adjustment at the junction between the two compensating members 21 and 22. In fact, the mechanical tension adjustment could be used to set or tune the Bragg grating 11 to any desired or standard frequency.

The material expansion constants and lengths required to cancel the temperature effect can be calculated as follows:

The free space Bragg wavelength is given by:

$$\lambda = 2n\Lambda$$

where n is the refractive index of the fiber core 5 and $\Lambda$ is the spacing of the Bragg grating 11. The change in Bragg wavelength for a temperature change $\Delta T$ from ambient is then given by:

$$\Delta\lambda/\lambda = (\alpha_f + \zeta)\Delta T + (1-p_e)\Delta\epsilon$$

where $\alpha_f$ is the thermal expansion coefficient of the fiber 4, $\Delta\epsilon$ is the change in the strain with $\Delta T$, $\zeta$ is the thermo-optic coefficient for the fiber material, and $P_e$ the photoelastic constant. These last two quantities are related to the change in index by:

$$\zeta = \left(\frac{1}{n}\right)\left(\frac{dn}{dt}\right); p_e = \left(-\frac{1}{n}\right)\left(\frac{dn}{d\epsilon}\right) = 0.22$$

Referring once more to FIG. 3, the change in length of the filter portion 17 is given by:

$$\Delta\epsilon L3 = (\alpha_1 L1 - \alpha_2 L2 - \alpha_f L3)\Delta T$$

where $\alpha_1$ L1 and $\alpha_2$ L2 correspond to the length changes of the materials in the reentrant cavity design. The normalized wavelength change per unit temperature change is given in terms of the length changes by the expression $$\Delta\lambda/\lambda\Delta T = \alpha_f + \zeta + (1-P_e)\{\alpha_1 L1/L3 - \alpha_2 L2/L3 - \alpha_f\}$$

To null out the temperature effects, the material constants and lengths $\alpha_1$, L1, $\alpha_2$, L2 are to be chosen so that $\Delta\lambda/\lambda\Delta T = 0$. Then, $$\alpha_f P_e + \zeta + (1-P_e)(\alpha_1 L1 - \alpha_2 L2)/L3 = 0$$

or $$(\alpha_2 L2 - \alpha_1 L1)/L3 = (\alpha_f P_e + \zeta)/(1-P_e)$$

For example, with the known constants $\alpha_f = 0.55\times10^{-6}/°$ C., $P_e = 0.22$, $\zeta = 8.31\times10^{-6}/°$ C. we have:

$$(\alpha_2 L2 - \alpha_1 L1)/L3 = 10.8\times10_{-6}$$

If aluminum is chosen as the material of the compensating member 22 and stainless steel as the material of the compensating member 21, we get the result:

$$24L2/L3 - 16L1/L3 = 10.8$$

Taking the fiber portion 45 length to be 1 cm (i.e. L3=1), and the fact that L1=L2+L3, the lengths L2=3.7 cm and L1=4.7 cm will give a null in the wavelength change with ambient temperature change.

The spring contacts 54, instead of being integral with the compensating member 21, could be constituted by discrete springs separate from and interposed between the compensating members 21 and 22 at the reference plane. Alternatively, the sealing means 53 may be utilized for both sealing and to provide a degree of spring force and eliminate the need for spring contacts 54. Furthermore, some other preloading or adjusting arrangement, such as an electrically driven piezoelectric or magnetodistortive device placed between the compensating members 21 and 22 could be used instead of the above described spring loaded mechanical adjusting screw arrangement 50 and 54 to adjust the preloaded tension on the fiber portion 45 and give a final adjustment to the filter frequency. One could also use the mechanical or electrical frequency adjust to scan or sweep the filter frequency over a small frequency range without the problem of ambient temperature affecting the result.

Thus, the temperature compensating strain on the fiber as described above, is superimposed on the pressure induced strain caused by external pressure fluctuations on the diaphragm. This results in an optical strain signal from the pressure transducer that is a function of pressure only, and is essentially free from any errors due to the effects of temperature on the optical fiber. Thus, a fiber optic pressure transducer with passive temperature compensation is achieved. The variations in pressure induced strain occurs by relieving the pretention the optical fiber section 45 when pressure is applied to the outward face 25 of the diaphragm 24. For example, when the device 1 is placed in a high pressure environment, the pressure applied to the outward face 25 of the diaphragm 26 causes the diaphragm to deflect and thereby relieve tension in the fiber section 45, thereby changing the stress in the Bragg grating 11. As discussed above, this causes a change in the central wavelength of the Bragg grating 11 due to a change in the periodic spacing of the grating, which will appear as a wavelength shift in the reflected light. The wavelength shift of the central reflected wavelength is related to the pressure change.

In addition to the use of a single reflective grating 11, as explained herein, an alternate embodiment of this invention can utilize a pair of reflective gratings 11 within the same length of fiber L3, thus forming a resonant cavity of longer length. Such a resonant cavity will also reflect light of a particular wavelength corresponding to central wavelength $\lambda$ of the reflective gratings. A change in the cavity length due to a pressure induced strain on fiber 4 over length L3 will result in phase shift in the reflected light due to the change in optical path length within the reflective cavity. Such a device, termed a Fabry-Perot interferometer, can then provide a high sensitivity means of detecting strain in the optical fiber, and the resultant optical phase shift can be detected using standard interferometer instrumentation techniques. Thus, it is possible with this technique to realize a pressure transducer with passive temperature compensation, which has enhanced pressure sensitivity compared to the previously described device of FIG. 1 which utilizes a single intracore reflective grating. Alternatively, the pair of Bragg gratings may be used to form a lazing element for detection, for example by positioning an Ebrium doped length of optical fiber between the pair of Bragg gratings.

The invention is described herein as using a weld of high strength adhesive between capillary tube 6 and the second compensating member 22 at an attachment location 30 to thereby provide a seal therebetween. As will be understood by those skilled in the art, the seal between the capillary tube 6 and the second compensating member 22 is also intended to prevent exposing the length of optical fiber L3 to environmental pressure so that the diaphragm 24 properly response to pressure exerted on its outward face 25. The exact location of a seal between the capillary tube 6 and the sensing device 1 may vary, provided that the differential pressure across the diaphragm 24 is representative of the measurand to be sensed.

Although the invention has been described and illustrated with respect to exemplary embodiments thereof, the foregoing and various other additions, and omission may be made therein and thereto without departing from the spirit and scope of the invention.

I claim:

1. A temperature compensated intrinsic optical fiber pressure sensing device including an intrinsic fiber optic sensor formed in a core of an optical fiber, comprising:

displacement means responsive to a pressure for applying a longitudinal strain in the optical fiber, thereby inducing a pressure stress in the intrinsic fiber optic sensor, said intrinsic fiber optic sensor being responsive to an optical signal and said pressure stress for providing a sensing light signal indicative of said pressure; and temperature compensation means responsive to a temperature for applying a longitudinal strain in the optical fiber, thereby inducing a temperature compensation stress in the intrinsic fiber optic sensor indicative of the temperature, wherein changes in said sensing light signal that are attributable to changes in said temperature compensation strain substantially compensates for changes in said sensing light signal attributable to changes in the temperature of said intrinsic fiber optic sensor.

2. The device of claim 1, wherein said displacement means includes a diaphragm responsive to the pressure for moving a displacement distance, and wherein said optical fiber is responsive to said displacement distance for inducing said pressure stress in said intrinsic fiber optic sensor.

3. The device of claim 2, wherein said temperature compensation means includes two compensating members each attached to said optical fiber at different longitudinal locations such that said intrinsic fiber optic sensor is situated between said locations, said two compensating members being connected to one another at a connecting region that is at least axially spaced from said different longitudinal locations, said compensating members being of materials exhibiting thermal expansion coefficients that differ from one another to such an extent that thermally induced longitudinal strains applied to said intrinsic fiber optic sensor as a result of differential axial thermal expansion between those portions of said compensating members that are disposed between said connecting region and that of said locations at which the respective one of said compensating member is attached to said optical fiber have said magnitude.

4. The device of claim 3, wherein said temperature compensation means further comprises means for adjustably connecting said compensating members to one another at said connecting region in such a manner as to be able to selectively vary the longitudinal distance between said locations and thus the longitudinal strains applied to said intrinsic fiber optic sensor independently of said thermally induced longitudinal strains.

5. The device of claim 4, wherein said intrinsic fiber optic sensor is a Bragg grating formed in a core of said optical fiber.

6. The device of claim 1, wherein said intrinsic fiber optic sensor is a Bragg grating formed in a core of said optical fiber.

* * * * *

UNITED STATES PATENT AND TRADEMARK OFFICE
CERTIFICATE OF CORRECTION

PATENT NO.     : 5,844,667
DATED          : December 1, 1998
INVENTOR(S)    : Robert J. Maron It is certified that error appears in the above-identified patent and that said Letters Patent is hereby corrected as shown below:

Title page,
After Item [58], insert the following:

--            [56] References Cited

U.S. PATENT DOCUMENTS

| | | | |
|---|---|---|---|
| 4,900,937 | 2/1990  | Dayton et al. ............. | 250/483.1 |
| 5,042,898 | 8/1991  | Morey et al. .............. | 385/37 |
| 5,163,321 | 11/1992 | Perales .................... | 73/151 |
| 5,315,100 | 5/1994  | Smith ...................... | 250/227.27 |
| 5,357,806 | 10/1994 | Dennis et al. ............. | 73/718 |
| 5,363,463 | 11/1994 | Kleinerman ............... | 385/123 |
| 5,399,854 | 3/1995  | Dunphy et al. ............ | 250/227.17 |
| 5,444,803 | 8/1995  | Kim et al. .................. | 385/28 |
| 5,452,087 | 9/1995  | Taylor et al. ............... | 356/352 |
| 5,485,745 | 1/1996  | Rademaker et al. ......... | 73/151 |
| 5,495,237 | 2/1996  | Yuasa et al. ................ | 340/854. 6 |

OTHER PUBLICATIONS

"High Sensitivity Intrinsic Fiber-Optic Fabry-Perot Pressure Sensor", Kao et al, Optical Letters/vol. 21, No. 8/Apr. 15, 1996, pp. 615-617 --

Signed and Sealed this

Twenty-third Day of July, 2002

*Attest:*

*Attesting Officer*

JAMES E. ROGAN
*Director of the United States Patent and Trademark Office*